(12) United States Patent
Radha et al.

(10) Patent No.: US 6,661,841 B2
(45) Date of Patent: Dec. 9, 2003

(54) SCALABLE VIDEO CODING SYSTEM

(75) Inventors: Hayder Radha, Mahwah, NJ (US); Yingwei Chen, Ossining, NY (US); Robert A. Cohen, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/197,328

(22) Filed: Jul. 17, 2002

(65) Prior Publication Data
US 2003/0002579 A1 Jan. 2, 2003

Related U.S. Application Data

(63) Continuation of application No. 09/867,891, filed on May 30, 2001, now Pat. No. 6,532,263, which is a continuation of application No. 09/110,616, filed on Jul. 6, 1998, now Pat. No. 6,292,512.

(51) Int. Cl.[7] ................................................ H04N 7/18
(52) U.S. Cl. ............................... 375/240.1; 375/240.19
(58) Field of Search ........................ 375/240.01–240.26

(56) References Cited

U.S. PATENT DOCUMENTS

| | | | | |
|---|---|---|---|---|
| 5,699,121 A | * | 12/1997 | Zakhor et al. | 375/240.17 |
| 5,896,176 A | * | 4/1999 | Das et al. | 375/240.15 |
| 6,101,279 A | * | 8/2000 | Nguyen et al. | 382/240 |
| 6,272,178 B1 | * | 8/2001 | Nieweglowski et al. | 375/240.03 |
| 6,510,177 B1 | * | 1/2003 | De Bonet et al. | 375/240.16 |
| 6,519,288 B1 | * | 2/2003 | Vetro et al. | 375/240.21 |
| 6,526,177 B1 | * | 2/2003 | Haskell et al. | 382/243 |

OTHER PUBLICATIONS

J. Li et al., "An Embedded DCT Approach to Progressive Image Compression," IEEE, (1996), 201–204, XP-002076834.*

* cited by examiner

Primary Examiner—Andy Rao

(57) ABSTRACT

A system for coding video data comprised of one or more frames codes a portion of the video data using a frame-prediction coding technique, and generates residual images based on the video data and the coded video data. The system then codes the residual images using a fine-granular scalability coding technique, and outputs the coded video data and at least one of the coded residual images to a receiver.

26 Claims, 8 Drawing Sheets

SCALABLE VIDEO CODING SYSTEM

CROSS REFERENCE TO REALATED APPLICATIONS

This is a continuation of application Ser. No. 09/867,891, filed May 30, 2001 now U.S. Pat. No. 6,532,263, which is a continuation of application Ser. No. 09/110,616, filed Jul. 6, 1998, now U.S. Pat No. 6,292,512.

BACKGROUND OF THE INVENTION

1. Field of the Invention

The present invention is directed to a scalable video coding system which codes video data using both frame-prediction and fine-granular scalable images. The invention has particular utility in connection with variable-bandwidth networks and computer systems that are able to accommodate different bit rates, and hence different quality images.

2. Description of the Related Art

Scalable video coding in general refers to coding techniques which are able to provide different levels, or amounts, of data per frame of video. Currently, such techniques are used by lead video coding standards, such as MPEG-2 and MPEG-4 (i.e., "Motion Picture Experts Group" coding), in order to provide flexibility when outputting coded video data.

In the scalable coding techniques currently employed by MPEG-2 and MPEG-4, an encoder codes frames of video data and divides the coded frames into a base layer ("BL") and an enhancement layer ("EL"). Typically, the base layer comprises a minimum amount of data required to decode the coded video data. The enhancement layer, on the other hand, comprises additional information which enhances (e.g., improves the quality of) the base layer when it is decoded. In operation, the encoder transmits all frames from the base layer to a receiving device, which can be a personal computer or the like. However, the encoder only transmits frames from the enhancement layer in cases where the receiving device has sufficient processing power to handle those additional frames and/or the medium over which the frames are transmitted has sufficient bandwidth.

FIGS. 1 and 2 show "scalability structures" which are currently used in MPEG-2 and MPEG-4 for the base layer and the enhancement layer. More specifically, FIG. 1 shows a scalability structure 1 which employs frame-prediction in base layer 2 to generate predicative (or "P") frames from an intra (or "I") frame or from a preceding P frame. As shown in the figure, frame-prediction is also used in the enhancement layer to generate P frames based on frames in the base layer. FIG. 2 shows another scalability structure 3 which is currently used in MPEG-2 and MPEG-4. In the scalability structure shown in FIG. 2, frame-prediction is again employed to determine P frames in the base layer. Unlike scalability structure 1, however, scalability structure 3 also uses frame-prediction in the enhancement layer to generate bi-directional (or "B") frames which, in this case, are interpolated from preceding frames in the enhancement layer and contemporaneous frames in the base layer. In general, MPEG-2 and MPEG-4 encoders use frame prediction in the manner set forth above to increase data compression and thus increase coding efficiency.

Another well-known scalable video coding technique is called fine-granular scalability coding. Fine-granular scalability coding codes the same image (e.g., a frame of video) using progressively more data each time coding takes place. For example, as shown in FIG. 3, image 4 is initially encoded using data sufficient to produce image 5. Thereafter, additional data is coded which is sufficient to produce enhanced images 6, 7 and 8 in succession.

Fine-granular scalability coding has several advantages over the frame-prediction techniques described above. Specifically, because fine-granular scalability coding can provide a wider range of enhanced images than frame-prediction techniques, fine-granular scalability coding is generally preferred in environments, such as the Internet, which have a wide range of available bandwidth. For similar reasons, fine-granular scalability coding is also generally preferred when dealing with receiving devices that have varying processing capabilities and/or bandwidth. That is, because fine-granular scalability coding produces a wide range of enhanced images, it is possible to match the appropriate image relatively closely to an amount of available bandwidth. As a result, in theory, it is possible to obtain the most amount of data for an image for a given amount of available bandwidth. On the down-side, fine-granular scalability coding does not permit the use of frame-prediction. As a result, it requires more data than the frame-prediction techniques described above and, consequently, degrades coding efficiency.

Thus, there exists a need for a scalable video coding technique which incorporates the efficiency of frame-prediction coding and the accuracy of fine-granular scalability coding.

SUMMARY OF THE INVENTION

The present invention addresses the foregoing need by coding a portion (e.g., a base layer) of input video data using a frame-prediction coding technique and then coding another portion (e.g., residual images in an enhancement layer) of the video data using fine-granular scalability coding. By coding a base layer using a frame-prediction coding technique, the present invention reduces the amount of bits required to code the video data and thus maintains coding efficiency. By coding the residual images using fine-granular scalability coding, the present invention is able to provide a wide range of residual images, one or more of which can be selected for transmission based, e.g., on an available bandwidth of a receiving device.

Thus, according to one aspect, the present invention is a system (i.e., a method, an apparatus, and computer-executable process steps) for coding video data comprised of one or more frames. The system codes a portion (e.g., a base layer) of the video data using a frame-prediction coding technique, and then generates residual images based on the video data and the coded video data. Thereafter, the system codes the residual images using a fine-granular scalability coding technique, and outputs the coded video data and at least one of the coded residual images to a receiver, such as a variable-bandwidth network or a networked device thereon.

In preferred embodiments of the invention, the system determines a bandwidth of the receiver, and then selects which of the coded residual images to output based on the bandwidth of the receiver. By doing this, the invention is able to output a coded residual image which is most appropriate for the available bandwidth.

In other preferred embodiments, the system codes the portion of the video data at a plurality of different bit rates so as to produce multiple versions of the coded video data, and generates a plurality of residual images for each version of the coded video data. In these embodiments, the system codes the residual images using a fine-granular scalability coding technique, determines variations in a bandwidth of the receiver over time, and then selects which one of the multiple versions and the coded residual images to output based on the variations in the bandwidth of the receiver.

By way of example, for a receiver bandwidth increasing from $B_1$ to $B_2$, where $B_1<B_2$, the system selects a first version of the coded video data and successively selects coded residual images corresponding to each frame of the first version of the coded video data, which are coded at successively higher bit rates. For a receiver bandwidth increasing from $B_2$ to $B_3$, where $B_2<B_3$, the system selects a second version of the coded video data and successively selects coded residual images corresponding to each frame of the second version of the coded video data, which are coded at successively higher bit rates. Conversely, for a receiver bandwidth decreasing from $B_3$ to $B_2$, where $B_3>B_2$, the system selects a first version of the coded video data and successively selects coded residual images corresponding to each frame of the first version of the coded video data, which are coded at successively lower bit rates. Likewise, for a receiver bandwidth decreasing from $B_2$ to $B_1$, where $B_2>B_1$, the system selects a second version of the coded video data and successively selects coded residual images corresponding to each frame of the second version of the coded video data, which are coded at successively lower bit rates.

As is clear from the foregoing, by coding a base layer at a plurality of different bit rates and then selecting versions of the base layer and the residual images based on a range of available bandwidth, during display the present invention is able to provide a relatively smooth transition between different versions of the base layer. That is, in conventional "simulcast" systems (i.e., systems such as this where a base layer has been coded at different bit rates), there is a substantial jump in image quality at the transition from a first bit rate to a second bit rate. The present invention, however, provides for a smoother transition by selecting and outputting fine-granular coded residual images between the different versions of the base layer.

According to another aspect, the present invention is a network system that includes an encoder which receives input video data and which outputs frames of coded video data therefrom, a variable-bandwidth network over which the frames of coded video data are transmitted, a decoder which receives the frames of coded video data from the variable-bandwidth network and which decodes the coded video data, and a display which displays the decoded video data. The encoder includes a processor and a memory which stores computer-executable process steps. The processor executes process steps stored in the memory so as to produce the frames of coded video data by (i) coding a base layer from the input video data using a frame-prediction coding technique, (ii) coding an enhancement layer from the input video data using a fine-granular scalability coding technique, (iii) determining a bandwidth of the variable-bandwidth network, and (iv) selecting, for output, the base layer and, in a case that the bandwidth of the variable-bandwidth network is greater than a predetermined value, a portion of the enhancement layer.

According to still another aspect, the present invention is a system for decoding video data comprised of an enhancement layer bitstream and a base layer bitstream, where the base layer bitstream is coded using a frame-prediction coding technique and the enhancement layer bitstream is encoded using a fine-granular scalability coding technique. The system receives the coded video data, decodes the base layer bitstream using a frame-prediction decoder, and decodes the enhancement layer bitstream using a fine-granular scalability decoder. Thereafter, the system combines (e.g., adds) decoded video data from the base layer bitstream and from the enhancement layer bitstream to form a video image.

According to still another aspect, the present invention is a system for coding video data and outputting coded video data to a plurality of receivers. The system codes a first portion of the video data using a frame-prediction coding technique to produce a first bitstream, and then codes a second portion of the video data using a fine-granular scalability coding technique to produce a second bitstream. The first bitstream is output to the plurality of receivers, whereafter the second bitstream is divided into two or more sub-streams. Finally, the two or more sub-streams are output to the plurality of receivers.

By virtue of the foregoing aspect of the invention, it is possible to multicast video data to a plurality of receivers. In other words, it is possible to broadcast coded data to the receivers at multiple bandwidths. These receivers may then accept only those bandwidths that they are able to process and/or receive. Thus, each receiver is able to receive and process as much data as it can handle, thereby resulting in more accurate image reproduction thereby.

This brief summary has been provided so that the nature of the invention may be understood quickly. A more complete understanding of the invention can be obtained by reference to the following detailed description of the preferred embodiments thereof in connection with the attached drawings.

DETAILED DESCRIPTION OF THE PREFERRED EMBODIMENTS

Figure 1:
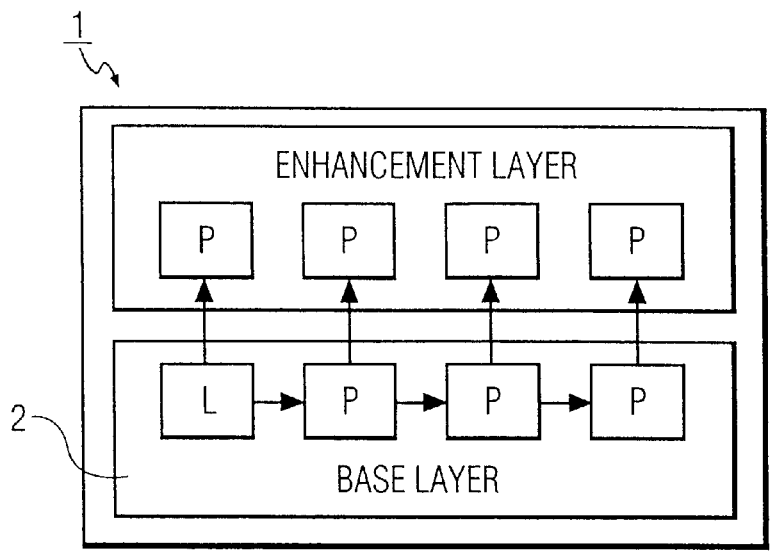
FIG. 1 depicts a scalability structure used with a conventional frame-prediction-type scalable coding technique.
Figure 2:
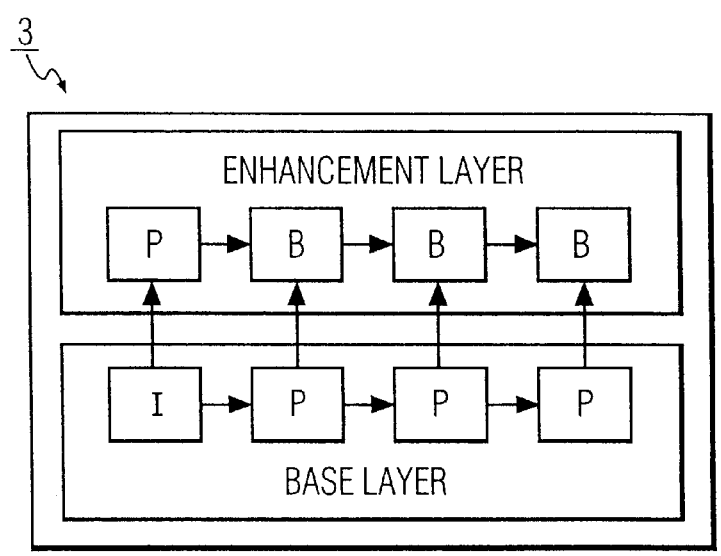
FIG. 2 depicts an alternative scalability structure used with a conventional frame-prediction-type scalable coding technique.
Figure 3:
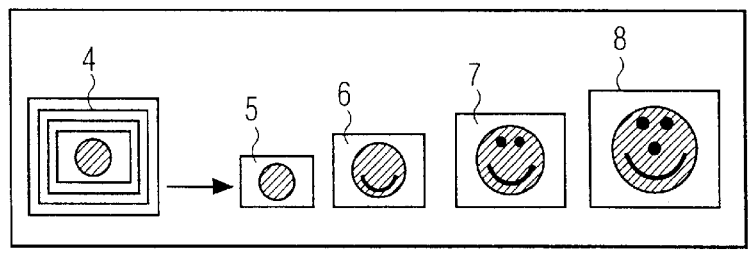
FIG. 3 depicts images generated using a fine-granular scalability coding/decoding technique.
Figure 4:
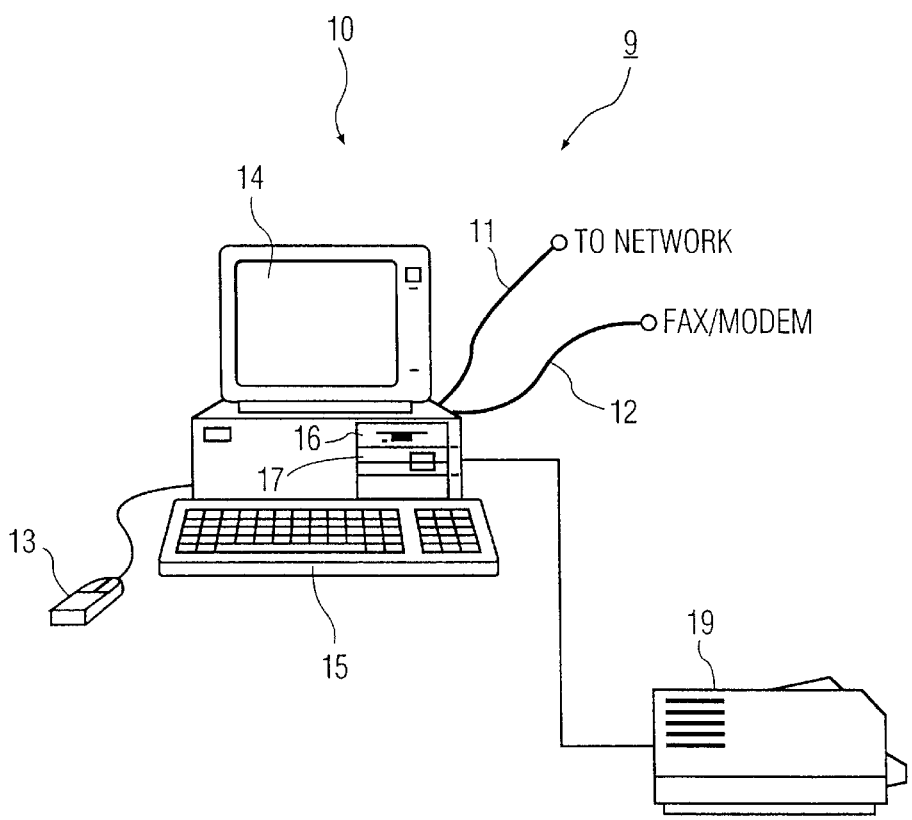
FIG. 4 depicts a computer system on which the present invention may be implemented.

FIG. 4 shows a representative embodiment of a computer system 9 on which the present invention may be implemented. As shown in FIG. 4, personal computer ("PC") 10 includes network connection 11 for interfacing to a network, such as a variable-bandwidth network or the Internet, and fax/modem connection 12 for interfacing with other remote sources such as a video camera (not shown). PC 10 also includes display screen 14 for displaying information (including video data) to a user, keyboard 15 for inputting text and user commands, mouse 13 for positioning a cursor on display screen 14 and for inputting user commands, disk drive 16 for reading from and writing to floppy disks installed therein, and CD-ROM drive 17 for accessing information stored on CD-ROM. PC 10 may also have one or more peripheral devices attached thereto, such as a scanner (not shown) for inputting document text images, graphics images, or the like, and printer 19 for outputting images, text, or the like.

Figure 5:
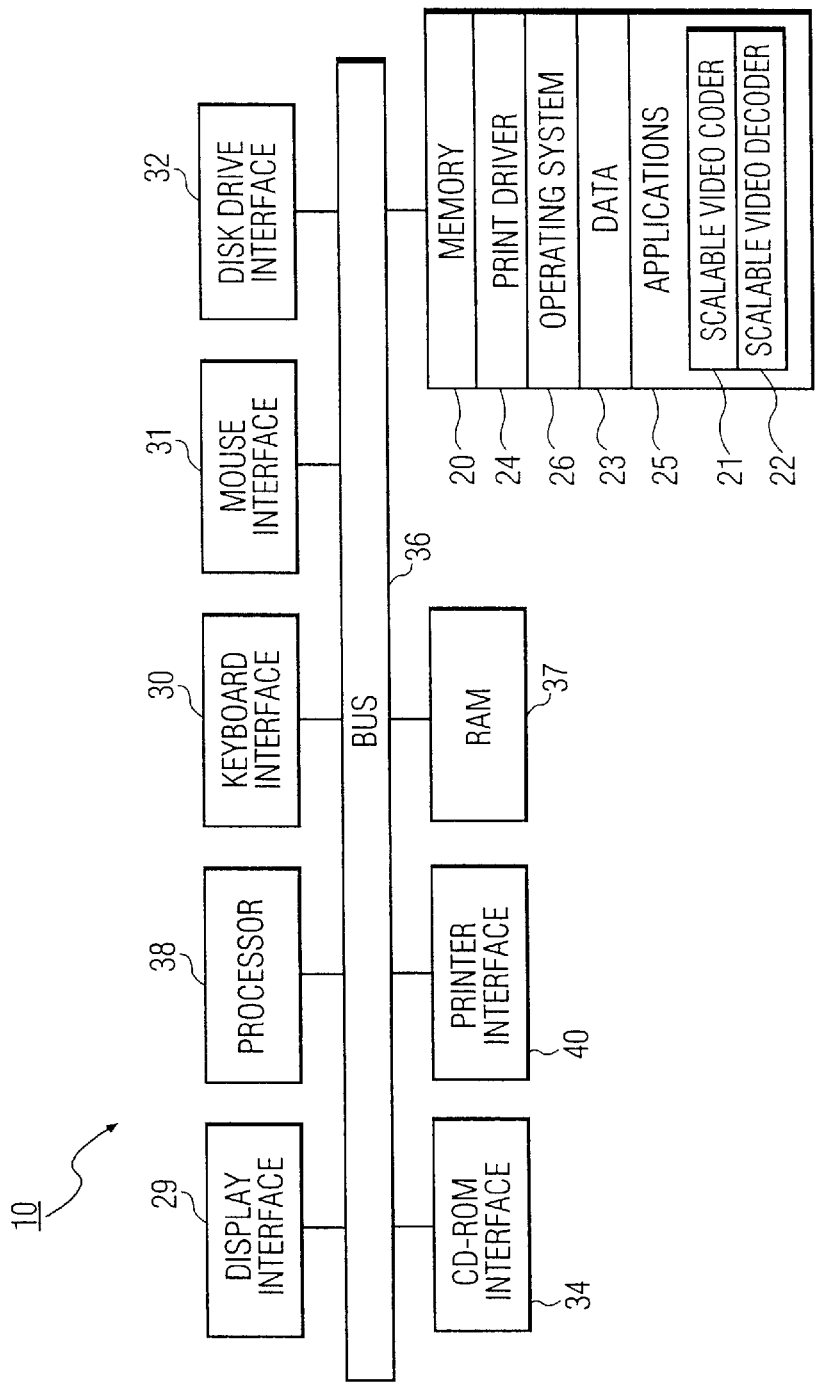
FIG. 5 depicts the architecture of a personal computer in the computer system shown in FIG. 4.

FIG. 5 shows the internal structure of PC 10. As shown in FIG. 5, PC 10 includes memory 20, which comprises a computer-readable medium such as a computer hard disk. Memory 20 stores data 23, applications 25, print driver 24, and operating system 26. In preferred embodiments of the invention, operating system 26 is a windowing operating system, such as Microsoft® Windows95; although the invention may be used with other operating systems as well. Among the applications stored in memory 20 are scalable video coder 21 and scalable video decoder 22. Scalable video coder 21 performs scalable video data encoding in the manner set forth in detail below, and scalable video decoder 22 decodes video data which has been coded in the manner prescribed by scalable video coder 21. The operation of these applications is described in detail below.

Also included in PC 10 are display interface 29, keyboard interface 30, mouse interface 31, disk drive interface 32, CD-ROM drive interface 34, computer bus 36, RAM 37, processor 38, and printer interface 40. Processor 38 preferably comprises a microprocessor or the like for executing applications, such those noted above, out of RAM 37. Such applications, including scalable video coder 21 and scalable video decoder 22, may be stored in memory 20 (as noted above) or, alternatively, on a floppy disk in disk drive 16 or a CD-ROM in CD-ROM drive 17. Processor 38 accesses applications (or other data) stored on a floppy disk via disk drive interface 32 and accesses applications (or other data) stored on a CD-ROM via CD-ROM drive interface 34.

Application execution and other tasks of PC 4 may be initiated using keyboard 15 or mouse 13, commands from which are transmitted to processor 38 via keyboard interface 30 and mouse interface 31, respectively. Output results from applications running on PC 10 may be processed by display interface 29 and then displayed to a user on display 14 or, alternatively, output via network connection 11. For example, input video data which has been coded by scalable video coder 21 is typically output via network connection 11. On the other hand, coded video data which has been received from, e.g., a variable bandwidth-network is decoded by scalable video decoder 22 and then displayed on display 14. To this end, display interface 29 preferably comprises a display processor for forming video images based on decoded video data provided by processor 38 over computer bus 36, and for outputting those images to display 14. Output results from other applications, such as word processing programs, running on PC 10 may be provided to printer 19 via printer interface 40. Processor 38 executes print driver 24 so as to perform appropriate formatting of such print jobs prior to their transmission to printer 19.

First Embodiment

Turning to scalable video coder 21, this module comprises computer-executable process steps which code video data comprised of one or more successive frames. In brief, these process steps code a portion of the video data using a frame-prediction coding technique, generate residual images based on the video data and the coded video data, and code the residual images using a fine-granular scalability coding technique. The steps then output the coded video data and at least one of the coded residual images to a receiver which, generally speaking, can comprise a network (variable-bandwidth or otherwise), a PC, or other video-supporting networkable devices including, but not limited to, digital televisions/settop boxes and video conferencing equipment.

Figure 6:
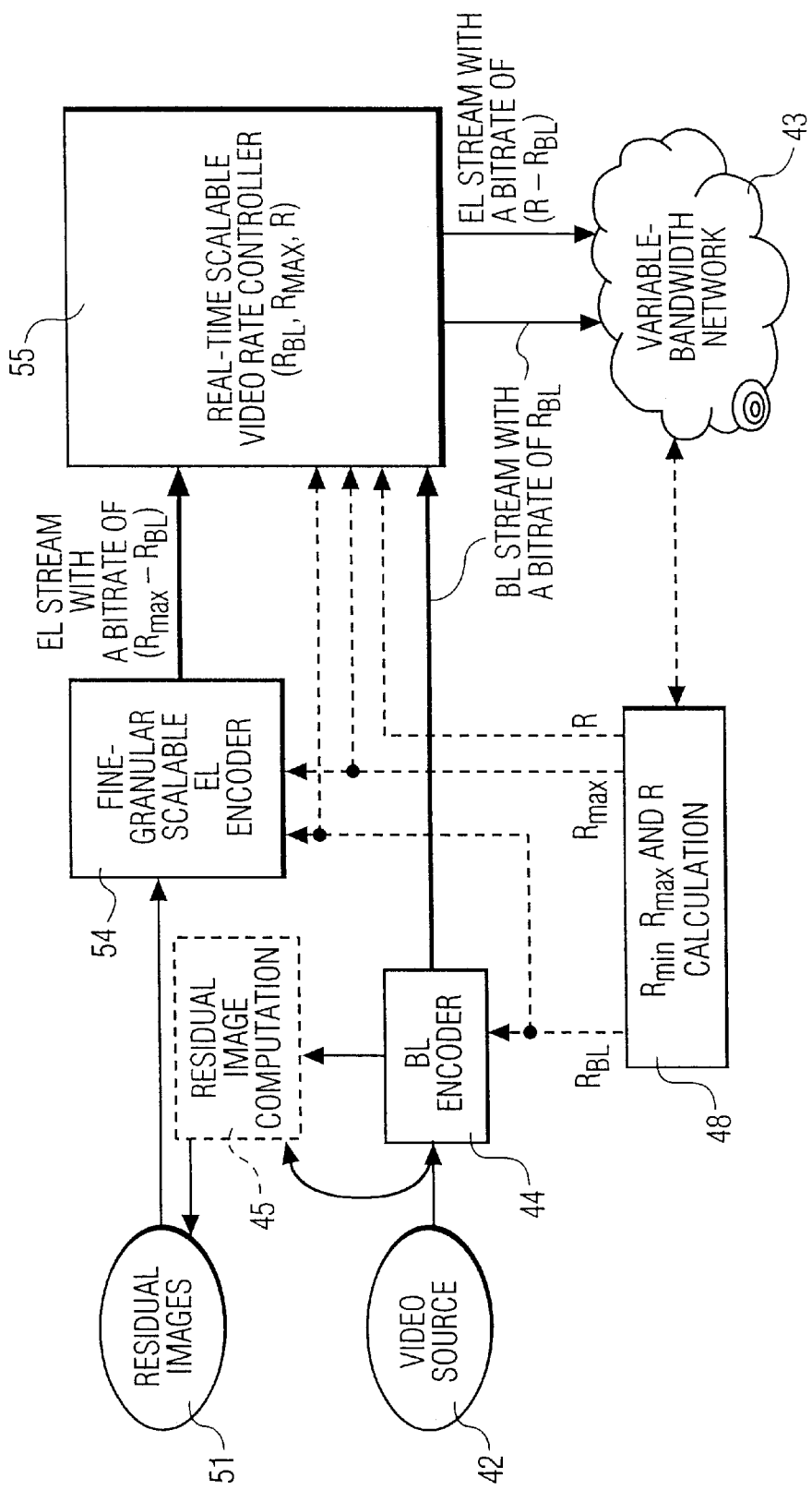
FIG. 6 is a functional block diagram showing elements of the first and second embodiments of the present invention.
Figure 7:
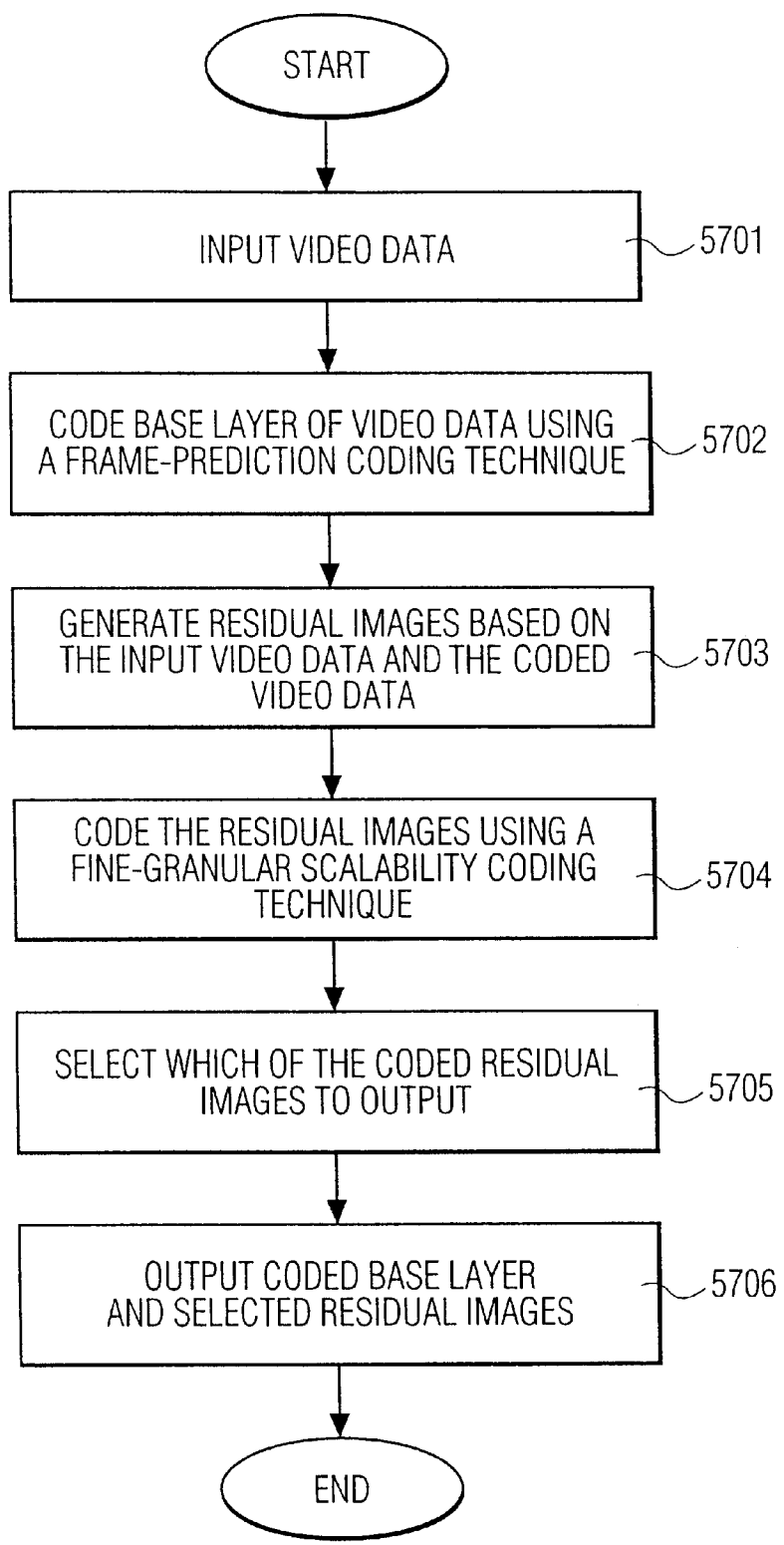
FIG. 7 is a flow diagram describing the scalability coding technique of the present invention.

FIG. 6 is a block diagram depicting a video source 42, a variable-bandwidth network 43, and modules used to effect the foregoing process steps. FIG. 7 is a flow diagram which explains the functionality of the modules shown in FIG. 6. To begin, in step S701 original uncoded video data is input into the present invention. This video data may be input via network connection 11, fax/modem connection 12, or, as shown in FIG. 6, via a video source. For the purposes of the present invention, video source 42 can comprise any type of video capturing device, an example of which is a digital video camera. As shown in FIG. 6, video data from the video source is input to both BL encoder 44 and residual image computation block 45. The reason for this is apparent below.

Next, step S702 codes a portion (i.e., a base layer, or BL) of the original video data using a standard frame-prediction coding technique. Step S702 is performed by BL encoder 44, which, in preferred embodiments of the invention, is an MPEG-1, an MPEG-2 or an MPEG-4 encoder. A general overview of the MPEG standard is provided in "MPEG: A Video Compression Standard For Multimedia Applications", by Didier LeGall, Communications of the ACM, Vol. 34, No. 4 (April 1991). BL encoder 44 compresses the video data at a predetermined bit-rate, $R_{BL}$. In preferred embodiments of the invention, $R_{BL}$ is determined by calculation block 48 based on a current bandwidth of a receiver, such as variable-bandwidth network 43 (or, e.g., a computer system having variable processing capabilities).

More specifically, calculation block 48 measures a minimum bit-rate ("$R_{MIN}$"), a maximum bit-rate ("$R_{MAX}$"), and a current available bandwidth ("R") of variable-bandwidth network 43. Calculation block 48 then sets $R_{BL}$ to a value between $R_{MIN}$ and R. In most cases, calculation block 48 sets $R_{BL}$ to $R_{MIN}$, so as to ensure that, even at its lowest bandwidths, variable-bandwidth network 43 will be able to accommodate coded video data output by the present invention. This is especially true in cases where base layer encoding takes place off-line.

Figure 8:
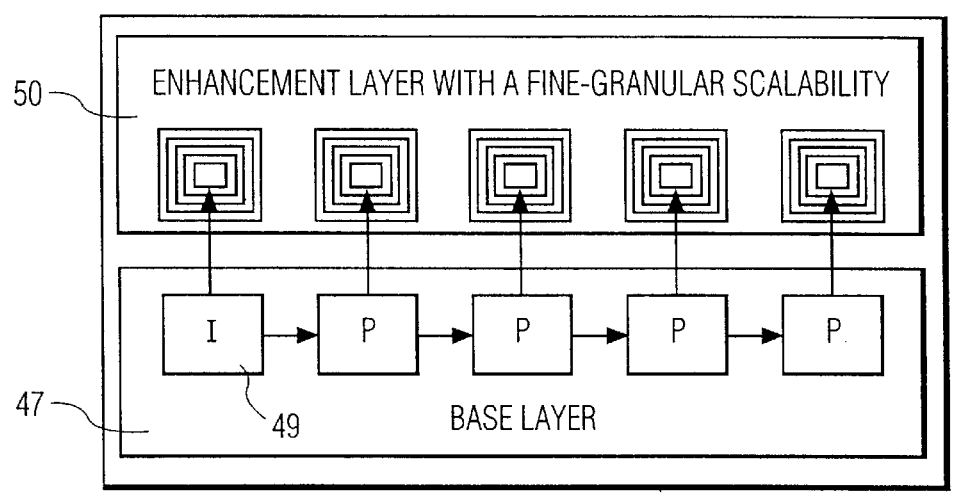
FIG. 8 shows a scalability structure generated by the present invention.

FIG. 8 shows an example of a scalability structure which is generated by the present invention. As shown in FIG. 8, this scalability structure includes both a base layer ("BL") and an enhancement layer ("EL"). Base layer 47 includes frames, such as frame 49. These frames are compressed at a bit-rate of $R_{BL}$ by BL encoder 44. Enhancement layer 50, however, includes fine-granular coded images corresponding to contemporaneous frames in the base layer. The following describes how the invention generates enhancement layer 50.

More specifically, step S703 generates residual images 51 based on the original video data input from video source 42 and based on coded video data (i.e. the base layer) provided by BL encoder 44. In the block diagram shown in FIG. 6, step S703 is performed by residual image computation block 45. In operation, residual image computation block 45 receives coded video data from BL encoder 44 and then decodes that coded video data. Thereafter, residual images 51 are generated based on a difference between pixels in this decoded video data and pixels in the original video data. Generally speaking, the residual images correspond to the difference between frames in the base layer (which comprises the minimum number of frames and/or the minimum amount of data required by a decoder to decode a video signal) and frames in the original video data.

Residual image computation block 45 may use one or more of variety of different methods to generate residual images 51. For example, in one embodiment of the invention, a simple pixel-by-pixel subtraction is performed between frames in the base layer and frames in the original video data. The resulting difference between these two sets of frames (i.e., the residual images) includes differences in the frames' resolutions. In cases where the base layer does not include entire frames of the original video data, the residual images include these missing frames.

In another embodiment of the invention, residual image computation block 45 generates residual images 51 by first filtering the decoded video data and then determining a difference between this filtered video data and the original video data. This technique has the advantage of removing unwanted noise and the like from the decoded video data caused, e.g., by the coding and decoding processes. In preferred embodiments of the invention, a deblocking filter is used to filter the decoded video data; although the invention is not limited to the use of this type of filter.

In still another embodiment of the invention, residual image computation block 45 generates residual images 51 by filtering both the decoded video and the original video data, and then determining a difference between both of these types of filtered data, in this embodiment, the same type of filter (e.g., a deblocking filter) may be applied to both the original video data and the decoded video data. Alternatively, different types of filters may be applied to the original video data and to the decoded video data.

In general, when filtering is used to generate residual images 51, a decoder for receiving video data that has been coded in accordance with the present invention should be "in synch" with the type of filtering used thereby, meaning that substantially the same type of filtering should be applied at the decoder in order to compensate for the effects of filtering. For example, if residual images 51 are coded based on filtered decoded video data, that same filtering should be applied to the residual images during decoding thereof.

Returning to FIG. 7, after step S703, processing proceeds to step S704. Step S704 codes the residual images using an embedded fine-granular scalability coding technique, as shown in the enhancement layer of the scalability structure of FIG. 8. In the embodiment of the invention shown in FIG. 6, this step is performed by fine-granular scalable EL encoder 54. EL encoder 54 codes residual images 51 at a bit-rate of $R_{MAX}$-$R_{BL}$ (i.e., the difference between the base layer bandwidth and maximum bandwidth of network 43) using a fine-granular coding technique. At this point, it is noted that, since a fine-granular scaling technique is used to code frames for the enhancement layer, frame prediction is not employed therein.

As shown in FIG. 6, values for $R_{MAX}$ and $R_{BL}$ are provided to EL encoder 54 by calculation block 48. Any of a variety, of well-known fine-granular coding techniques may be used by EL encoder 54. Examples of these include an embedded discrete cosine transform ("DCT") technique and a scalable matching pursuit ("MP") technique. Preferred embodiments of the invention, however, use one of the family of wavelet transforms (e.g., zero tree wavelet transforms) to effect enhancement layer coding. For example, the preferred embodiment of the invention uses the still-image coding technique provided in MPEG-4 to perform fine-granular scalability coding. This approach codes images as whole using wavelet transforms.

Regardless of what type of fine-granular scalability coding is used by EL encoder 54, an EL bitstream is output therefrom which has a bit-rate of $R_{MAX}$-$R_{BL}$. This EL bitstream comprises a plurality of embedded fine-granular scalable images, meaning that the bitstream is comprised of an initial coarse image and one or more enhancements thereto. For example, the EL bitstream may include a coarse image comprised of a predetermined number of bits (e.g., the first 100 bits) in the bitstream; an enhancement image comprising the coarse image and the next predetermined number of bits (e.g., the next 100 bits) in the bitstream; a further enhancement image comprising the coarse image, the enhancement image, and the next predetermined number of bits (e.g., the next 100 bits) in the bitstream; and so on. The number of bits used to enhance these images (100 bits in this example) is referred to as the image's granularity.

At this point, it is noted that the present invention is not limited to using 100 bit granularity, or even to using the same number of bits to enhance the image. In fact, the granularity used by the invention can vary and, in preferred embodiments, can reach down to the byte level or even to the single bit level wherein single bits are used to enhance an image.

As shown in FIG. 6, the EL bitstream is provided to real-time scalable video rate controller 55 which performs, in real-time, steps S705 and S706 shown in FIG. 7. In step S705, controller 55 receives $R_{BL}$, $R_{MAX}$ and R from calculation block 48, and then selects, for each frame in the base layer, one or more of the coded residual images in enhancement layer 50 (see FIG. 8) based on these values. In particular, controller 55 selects image(s) from the enhancement layer which have a bandwidth that substantially corresponds to R-$R_{BL}$, i.e., the difference between the actual bandwidth of network 43 and the bandwidth of the base layer. Controller 55 selects these images by transmitting images from the EL bitstream (e.g., a coarse image and/or image enhancements) having a bandwidth that corresponds to R-$R_{BL}$, and blocking transmission of those image enhancements which fall outside of that range. By implementing the invention using a relatively fine granularity, such as single-bit granularity, the invention is able to fill substantially all of the bandwidth between R and $R_{BL}$. In these cases, the invention is able to provide substantially the maximum amount of video data for the given amount of available bandwidth. Of course, in cases' where the receiver can handle only coded images from the base layer, controller 55 will not transmit any fine-granular scalable images from the enhancement layer.

Assuming, however, that these images are to be transmitted, once the appropriate fine-granular scalable images (i.e., coded residual images) have been selected by controller 55, processing proceeds to step S706. In step S706, controller 55 outputs the base layer and the fine-granular scalable images selected in step S705. As shown in FIG. 6, the images are output to variable-bandwidth network 43 as a BL stream and an EL stream.

Figure 9:
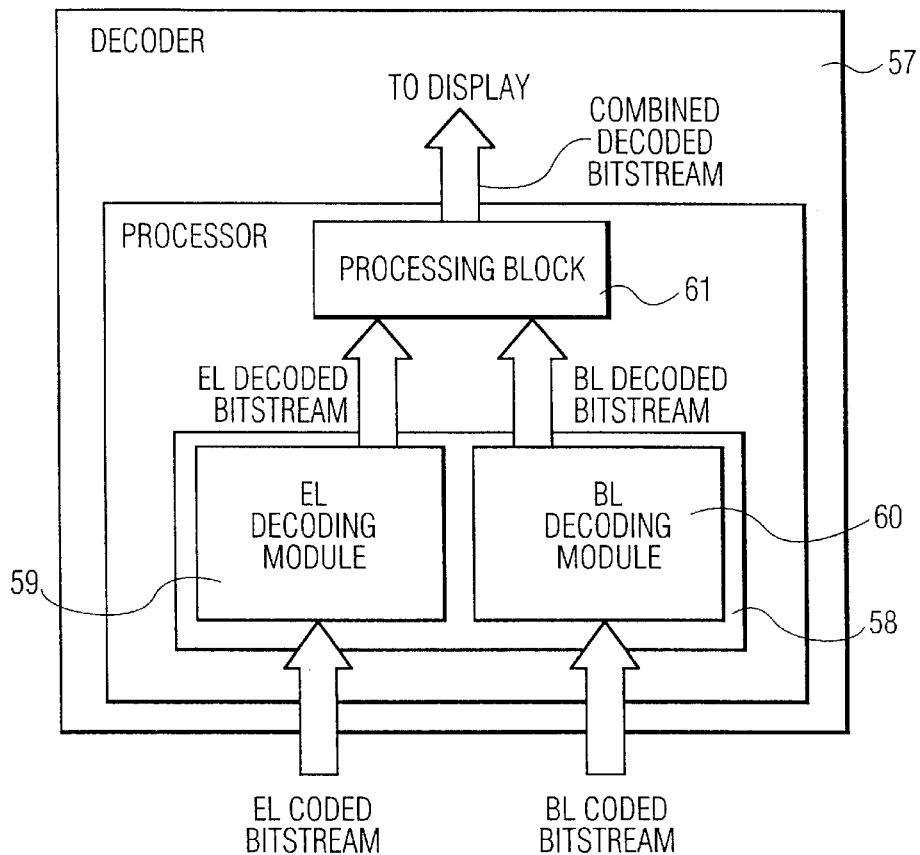
FIG. 9 is a block diagram of a decoder in accordance with the present invention.

A decoder, a functional block diagram for which is shown in FIG. 9, then receives these coded bitstreams and decodes the data therein. Decoder 57 may comprise a PC, such as that shown in FIG. 4 or, alternatively, any of the other receivers mentioned above. As shown in the figure, decoder 57 includes a scalable video decoder module 58 which is executed by a processor therein. This scalable video decoder module is comprised of a fine-granular scalable EL decoding module 59 for decoding data in the EL bitstream and a frame-prediction BL decoding module 60 for decoding frames in the BL bitstream. In preferred embodiments of the present invention, BL decoding module 60 comprises an MPEG-1, MPEG-2 or MPEG-4 decoding module. Due to the fine granularity of the EL bitstream, the EL decoder can decode any appropriate portion of the EL bitstream limited, e.g., by decoder processing constraints or the like. Once the respective decoding modules have decoded the streams of video data, frames therefrom are added and reordered, if necessary, by processing block 61. These frames may then be displayed to a user.

Second Embodiment

The second embodiment of the present invention generates a scalability structure like that shown in FIG. 8 for each of a plurality of "simulcast" bitstreams. Briefly, in the second embodiment of the present invention, scalable video coder 21 includes computer-executable process steps to code a portion (e.g., the base layer) of input video data at a plurality of different bit rates so as to produce multiple versions of coded video data, to generate a plurality of residual images for each version of the coded video data, to code the plurality of residual images for each version of the coded video data using a fine-granular scalability coding technique, and then to output one version (e.g., one base layer) of the coded video data together with one or more coded residual images therefor.

More specifically, in this embodiment of the invention, BL encoder 44 codes the base layer at a plurality of different bit rates $R_{B1}, R_{B2}, R_{B3} \ldots R_{BN}$, where $$R_{MIN} < R_{B1} < R_{B2} < R_{B3} \ldots < R_{BN} < R_{MAX}.$$

For each of these resulting simulcast coded bitstreams, residual image computation block 45 generates residual images in the manner described above. Thereafter, EL encoder 54 generates corresponding fine-granular coded images for each set of residual images. These fine-granular coded images have bit-rates of $R_{E1}, R_{E2}, R_{E3} \ldots R_{EN}$, which are determined in substantially the same manner as those of the EL bitstream of the first embodiment. That is, $$R_{E1} = R_{E1MAX} - R_{B1} \quad (1)$$
$$R_{E2} = R_{E2MAX} - R_{B2}$$
$$\vdots$$
$$R_{E(N-1)} = R_{E(N-1)MAX} - R_{B(N-1)}$$
$$R_N = R_{MAX} - R_{BN},$$

where $R_{EM} \in [R_{BM}, R_{MAX}]$ and $M \in [1,N]$. In a case that the maximum EL bit-rate for a particular BL bitstream is set as the minimum bit-rate of a next simulcast BL bitstream, equations (1) reduce to $$R_{E1} = R_{B2} - R_{B1} \quad (1)$$
$$R_{E2} = R_{B3} - R_{B2}$$
$$\vdots$$
$$R_{E(N-1)} = R_{BN} - R_{B(N-1)}$$
$$R_N = R_{MAX} - R_{BN}.$$

Figure 10:
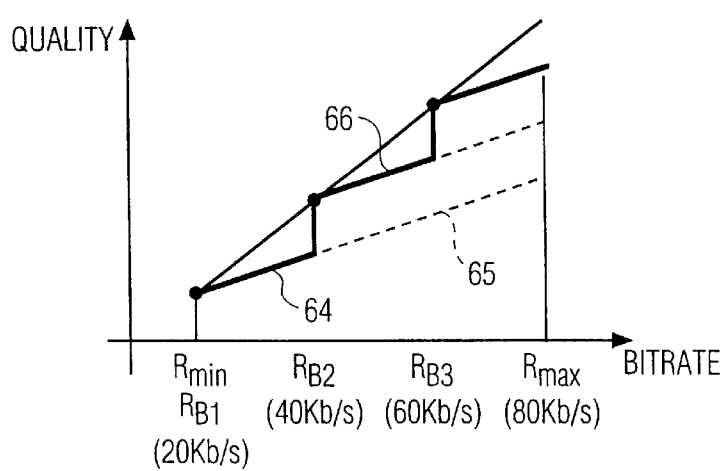
FIG. 10 is a graph depicting image quality versus bit-rate for simulcast bitstreams generated by the second embodiment of the present invention.

FIG. 10 is an example of a graph of image quality versus bit-rate which explains the case corresponding to equations (2). More specifically, as shown in FIG. 10, the invention initially selects a scalability structure having a base layer with a bit-rate $R_{B1}$ (which, in this case is $R_{MIN}$). The invention then monitors parameters of variable-bandwidth network 43 via calculation block 48, and determines a new bandwidth R therefor periodically. As the bandwidth of variable-bandwidth network 43 increases over time, controller 55 selects progressively more detailed fine-granular coded residual images for each frame of the selected scalability structure/base layer, and outputs those images to the receiver. The receiver then provides those image to a display, such as display 14 above, thereby leading to the progressive increase in image quality shown by line 64 in FIG. 10. However, using the scalability structure for $R_{B1}$, it is only possible to provide a limited increase in image quality, as shown by dotted line 65 in FIG. 10.

Accordingly, once the bandwidth R of variable bandwidth network 43 reaches a predetermined level (which may be pre-set in controller 55), the scalability structure for bit-rate $R_{B2}$ is selected. As was the case above, the invention then continues to monitor variable-bandwidth network 43 via calculation block 48, and to re-calculate the bandwidth thereof over time. As the bandwidth of variable-bandwidth network 43 increases, controller 55 selects progressively more detailed fine-granular coded residual images for each frame of the selected scalability structure/base layer, and outputs those images to the receiver. The receiver then provides those image to a display, such as display 14 above, thereby leading to the further progressive increase in image quality shown by line 66 in FIG. 10. A process similar to this is performed up to $R_{MAX}$.

By virtue of the foregoing process, this embodiment of the invention is able to use simulcast bitstreams to provide an overall increase image quality without large "jumps" at transition points $R_{B2}$ and $R_{B3}$. That is, conventional systems which use simulcast bitstreams to increase image quality have a large "jump" at each transition point between two simulcast bitstreams. This results in an abrupt transition in the displayed image. In contrast, because the present invention uses fine-granular images between the transition points, the invention is able to provide a gradual transition between bitstreams, along with a continuous increase in image quality over time.

Of course, the converse of the foregoing occurs for variable-bandwidth networks that have decreasing bandwidth. That is, for a receiver bandwidth decreasing from $B_3$ to $B_2$, where $B_3 > B_2$, the invention selects a first base layer and successively selects fine-granular coded residual images corresponding to each frame of the first base layer that are coded at successively lower bit rates. As the bandwidth decreases from $B_2$ to $B_1$, where $B_2 > B_1$, the invention selects a second base layer and successively selects fine-granular coded residual images corresponding to each frame of the second base layer that are coded at successively lower bit rates. This results in a relatively smooth decrease in image quality, as opposed to an abrupt transition. Of course, relatively smooth transitions are also achieved by the present invention for variable-bandwidth networks that have neither continuously increasing nor continuously decrease bandwidths, but rather have fluctuating or oscillating bandwidths. Such is also the case for computer systems or the like which have varying processing capabilities At this point, it is noted that although the first two embodiments of the present invention have been described with respect to a variable-bandwidth network, these embodiments can be used outside of a network context. That is, rather than measuring network bandwidth, the invention may measure the processing capabilities of a receiving device (e.g., a PC) and then vary coding accordingly.

Third Embodiment

Figure 11:
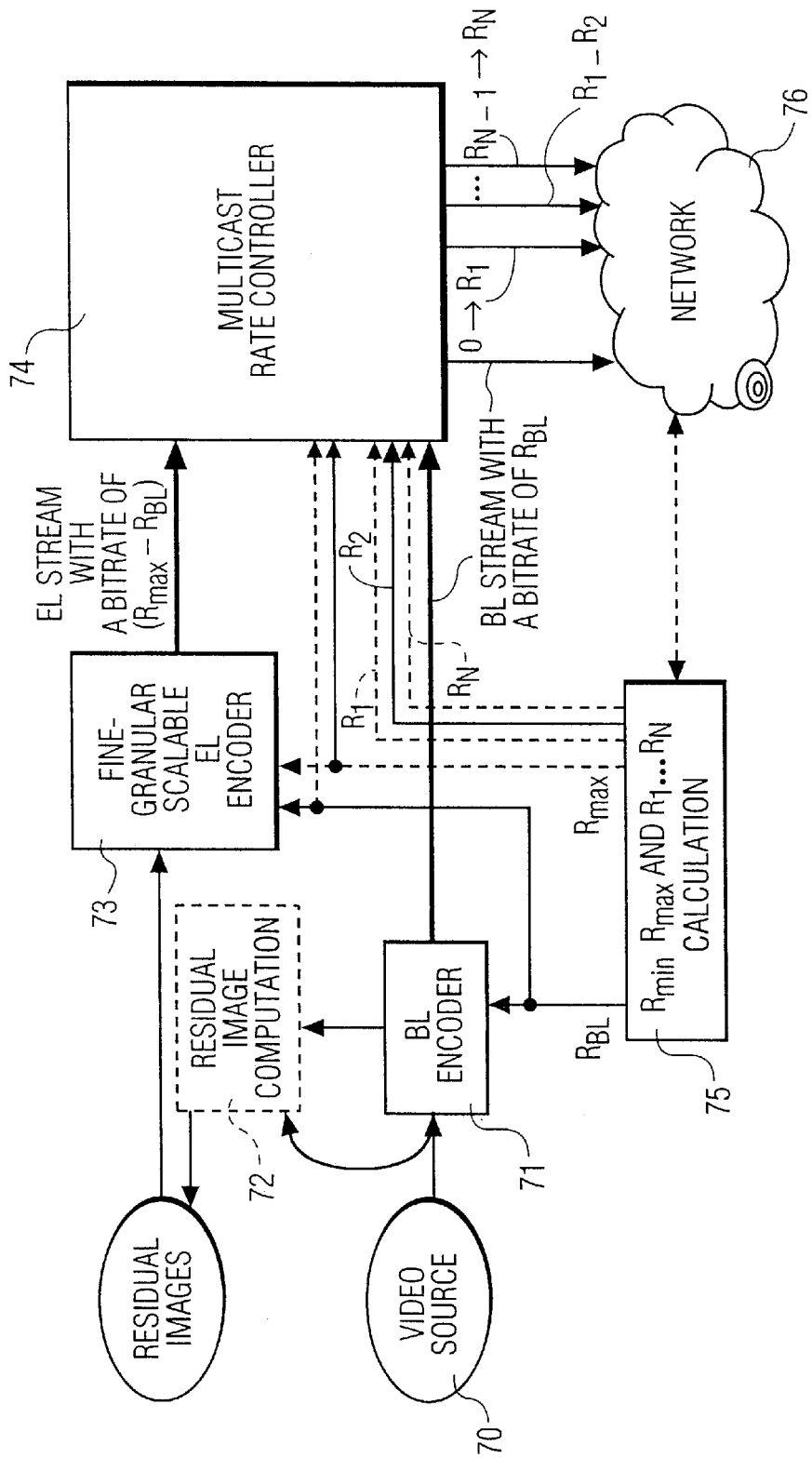
FIG. 11 is a functional block diagram showing elements of the third embodiment of the present invention.

FIG. 11 depicts a third embodiment of the present invention. In brief, this embodiment is a method and corresponding apparatus and process steps for coding video data and for multicasting coded video data to a plurality of receivers. In this embodiment, scalable video coder 21 codes a first portion of the video data (e.g., the base layer) using a frame-prediction coding technique to produce a first bitstream (e.g., the BL bitstream), and then codes a second portion of the video data (e.g., the enhancement layer) using a fine-granular scalability coding technique to produce a second bitstream (e.g., the EL bitstream). Thereafter, the first bitstream is output to one or more of the plurality of receivers, and the second bitstream is divided into two or more sub-streams These two or more sub-streams are then also output to the plurality of receivers.

As shown in FIG. 11, the third embodiment of the invention includes video source 70, BL encoder 71, residual image computation block 72, and EL encoder 73. These features are identical to those described above with respect to the first embodiment. Accordingly, detailed descriptions thereof are omitted herein for the sake of brevity. As shown in FIG. 11, the third embodiment also includes multicast rate controller 74 and calculation block 75. Detailed descriptions of these features of the invention are as follows.

Calculation block 75 is similar to calculation block 48 described above in that it determines $R_{MIN}$, $R_{MAX}$ and $R_{BL}$. In this embodiment, however, $R_{MIN}$ comprises the minimum bandwidth among plural receivers (e.g., PCs) on network 76 and $R_{MAX}$ comprises the maximum bandwidth among the plural receivers on network 76. As above, calculation block 75 sets $R_{BL}$ to a value between $R_{MIN}$ and $R_{MAX}$, and usually to $R_{MIN}$ so as to ensure that even the lowest bandwidth receiver will be able to process coded video data output by the present invention. As shown in FIG. 11, in this embodiment of the invention, calculation block 75 also determines bandwidths $R_1, R_2 \ldots R_N$ for corresponding categories of receivers 1, 2 ... N (not shown) on network 76. This may be done by monitoring the network for traffic to and from these receivers and/or issuing status inquiries to the respective receivers. Thereafter, these values for $R_1, R_2 \ldots R_N$ are provided to multicast rate controller 74.

Multicast rate controller 74 uses $R_1, R_2 \ldots R_N$ to divide the EL bitstream into sub-streams ranging from 0 bits to RN bits. That is, as shown in FIG. 11, multicast rate controller 74 divides the EL bitstream into sub-streams having bandwidths of:

$$0 \to R_1$$
$$R_1 \to R_2$$
$$R_{N-1} \to R_N, \quad (3)$$

where $R_N$ is less than or equal to $R_{MAX}-R_{BL}$. Each of these sub-streams corresponds to embedded fine-granular coded residual images. Specifically, the 0 to $R_1$ bitstream comprises a coarse image; the $R_1$ to $R_2$ sub-stream comprises an enhancement to the coarse image; and so on. The sub-streams described in expression (3) above are then output to receivers on network 76, together with the BL bitstream. These receivers will then accept the BL bitstream and one, some, all, or none of these sub-streams, depending upon the processing capabilities of the receiver and/or the network. Decoders, such as that shown in FIG. 9, at these receivers may then be used to decode the bitstreams.

Of course, those skilled in the art will realize that it is also possible to combine the second and third embodiments of the invention so as to produce an encoder which multicasts sub-streams for a plurality of simulcast BL bitstreams. In addition, although this embodiment has been described with respect to networked receivers, it is noted that the embodiment can be used with non-networked receivers as well. The invention can also be used to provide coded data to a plurality of variable-bandwidth networks connected, e.g., to a single PC or the like via plural network connections.

Likewise, although the three embodiments of the invention described herein are preferably implemented as computer code, all or some of the components shown in FIGS. 6 and 11 can be implemented using discrete hardware elements and/or logic circuits. The same is true for the decoder shown in FIG. 9. Thus, for example, calculation blocks 48 and 75 can comprise a workstation, PC or other operator-driven device for inputting and selecting required control and command parameters. Lastly, while the encoding and decoding techniques of the present invention have been described in a PC environment, these techniques can be used in any type of video devices including, but not limited to, digital televisions/settop boxes, video conferencing equipment, and the like.

In this regard, the present invention has been described with respect to particular illustrative embodiments. It is to be understood that the invention is not limited to the above-described embodiments and modifications thereto, and that various changes and modifications may be made by those of ordinary skill in the art without departing from the spirit and scope of the appended claims.

What is claimed is:

1. A method of coding video data comprised of one or more frames, the method comprising:

a coding step for producing coded video data by coding a portion of the video data using a frame-prediction coding technique;

a generating step for generating residua images based on the video data and the coded video data; and a coding step for producing coded residual images by coding the residual images using a fine-granular scalability coding technique.

2. The method according to claim 1, wherein the coding step for producing coded video data by coding a portion of the video data using a frame-prediction coding technique codes the portion of the video data using one of MPEG-1, MPEG-2 and MPEG-4.

3. The method according to claim 1, wherein the generating step comprises the steps of:

decoding the coded video data to produce decoded video data; and determining the residual images by determining a difference between pixels in the video data a d pixels in the decoded video data.

4. The method according to claim 1, wherein the generating step comprises the steps of:

decoding the coded video data to produce decoded video data;

filtering the decoded video data to produce filtered video data; and determining the residual images by determining a difference between pixels in the video data and pixels in the filtered video data.

5. The method according to claim 4, wherein the filtering step is performed using a deblocking filter.

6. The method according to claim 1, wherein the generating step comprises the steps of:

filtering the video data to produce first filtered video data;

decoding the coded video data to produce decoded video data;

filtering the decoded video data to produced second filtered video data; and determining the residual images by determining a difference between pixels in the first filtered video data and pixels in the second filtered video data.

7. The method according to claim 1, wherein the fine-granular coding technique comprises a member of the wavelet transform family of coding techniques.

8. The method according to claim 1, wherein the fine-granular coding technique comprises an embedded discrete cosine transform ("DCT") coding technique.

9. The method according to claim 1, wherein the fine-granular coding technique comprises a scalable matching pursuit ("MP") coding technique.

10. An apparatus for coding video data comprised of one or more frames, the apparatus comprising:
   a memory which stores computer-executable process steps; and
   a processor which executes the process steps stored in the memory so as (i) to produce coded video data by coding a portion of the video data using a frame-prediction coding technique, (ii) to generate residual images based on the video data and the coded video data, and (iii) to produce coded residual images by coding the residual images using a fine-granular scalability coding technique.

11. The apparatus according to claim 10, wherein the coded residual images comprise, for each frame of the coded video data, a plurality of different fine-granular scalable images each coded at a different bit rate.

12. The apparatus according to claim 10, wherein the processor codes the portion of the video data using one of MPEG-1, MPEG-2 and MPEG-4.

13. The apparatus according to claim 10, wherein the processor generates the residual images by (i) decoding the coded video data to produce decoded video data, and (ii) determining the residual images by determining a difference between pixels in the video data and pixels in the decoded video data.

14. The apparatus according to claim 10, wherein the processor generates the residual images by (i) decoding the coded video data to produce decoded video data, (ii) filtering the decoded video data to produce filtered video data, and (iii) determining the residual images by determining a difference between pixels in the filtered video data and pixels in the video data.

15. The apparatus according to claim 14, wherein the processor filters the decoded video data using a deblocking filter.

16. The apparatus according to claim 10, wherein the processor generates the residual images by (i) filtering the video data to produce first filtered vide data, (ii) decoding the coded video data to produce decoded video data, (iii) filtering the decoded video data to produce second filtered video data, and (iv) determining the residual images by determining a difference between pixels in the first filtered video data and pixels i the second filtered video data.

17. The apparatus according to claim 10, wherein the fine-granular coding technique comprises a member of the wavelet transform family of coding techniques.

18. The apparatus according to claim 10, wherein the fine-granular coding technique comprises an embedded discrete cosine transform ("DCT") coding technique.

19. The apparatus according to claim 10, wherein the fine-granular coding technique comprises a scalable matching pursuit ("MP") coding technique.

20. Computer-executable process steps to code video data comprised of one or more frames, the computer executable process steps being stored on a computer-readable medium and comprising:
   a coding step to produce coded vide data by coding a portion of the video data using a frame-prediction coding technique;
   a generating step to generate residual images based on the video data and the coded video data; and
   a coding step to produce coded residual images by coding the residual images using a fine-granular scalability coding technique.

21. An apparatus for coding video data comprised of one or more frames, the apparatus comprising:
   a first coding means for producing coded video data by coding a portion of the video data using a frame-prediction coding technique;
   a generating means for generating residual images based on the video data and the coded video data; and
   a second coding means for producing code residual images by coding the residual images using a fine-granular scalability coding technique.

22. A method of decoding coded video data comprised of an enhancement layer and a base layer, where the base layer is coded using a frame-prediction coding technique and the enhancement layer is encoded using a fine-granular scalability coding technique, the method comprising the steps of:
   receiving the coded video data;
   decoding the base layer using a frame-prediction decoder;
   decoding the enhancement layer using a fine-granular scalability decoder; and
   combining decoded video data from the base layer and from the enhancement layer to form a video image.

23. The method according to claim 22, wherein the frame-prediction decoder comprises one of an MPEG-1 decoder, an MPEG-2 decoder, and an MPEG-4 decoder.

24. An apparatus for decoding coded video data comprised of an enhancement layer and a base layer, where the base layer is coded using a frame-predict on coding technique and the enhancement layer is encode using a fine-granular scalability coding technique, t e apparatus comprising:
   a memory which stores computer-executable process steps; and
   a processor which executes the process steps stored in the memory so as (i) to receive the coded video data, (ii) to decode the base layer using a frame-prediction decoder, (iii) to decode the enhancement layer using a fine-granular scalability decoder, and (iv) to combine decoded video data from the base layer and from the enhancement layer to form a video image.

25. The apparatus according to claim 24, wherein the frame-prediction decoder comprises one of an MPEG-1 decoder, an MPEG-2 decoder, and an MPEG-4 decoder.

26. Computer-executable process steps stored on a computer-readable medium, the computer-executable process steps to decode coded video data comprised of an enhancement layer and a base layer, where the base layer is coded using a frame-prediction coding technique and the enhancement layer is encoded using a fine-granular scalability coding technique, the computer-executable process steps comprising:
   a receiving step to receive the coded video data;
   a decoding step to decode the base layer using a frame-prediction decoder;
   a decoding step to decode the enhancement layer using a fine-granular scalability decoder; and
   a combining step to combine decoded vide data from the base layer and from the enhancement layer to form a video image.

* * * * *